United States Patent [19]
Mason et al.

[11] Patent Number: 5,319,760
[45] Date of Patent: Jun. 7, 1994

[54] TRANSLATION BUFFER FOR VIRTUAL MACHINES WITH ADDRESS SPACE MATCH

[75] Inventors: Andrew H. Mason, Hollis, N.H.; Judith S. Hall, Sudbury, Mass.; Paul T. Robinson, Arlington, Mass.; Richard T. Witek, Littleton, Mass.

[73] Assignee: Digital Equipment Corporation, Maynard, Mass.

[21] Appl. No.: 722,869

[22] Filed: Jun. 28, 1991

[51] Int. Cl.⁵ .............................. G06F 12/10
[52] U.S. Cl. ................ 395/400; 364/DIG. 1; 364/243.4; 364/256.3; 364/255.1
[58] Field of Search ... 364/200 MS File, 900 MS File, 364/400; 395/425

[56] References Cited

U.S. PATENT DOCUMENTS

| | | | |
|---|---|---|---|
| 4,075,686 | 2/1978 | Calle et al. | 395/275 |
| 4,525,778 | 6/1985 | Cane | 395/425 |
| 4,638,426 | 1/1987 | Chang et al. | 395/400 |
| 4,787,031 | 11/1988 | Karger et al. | 395/800 |
| 4,802,084 | 1/1989 | Ikegaya et al. | 395/400 |
| 4,802,085 | 1/1989 | Levy et al. | 395/375 |
| 4,811,215 | 3/1989 | Smith | 395/375 |
| 4,816,991 | 3/1989 | Watanabe et al. | 395/400 |
| 4,933,835 | 6/1990 | Sachs et al. | 395/425 |
| 5,029,070 | 7/1991 | McCarthy et al. | 395/425 |
| 5,067,609 | 11/1991 | Fite et al. | 395/375 |
| 5,095,424 | 3/1992 | Woffinden et al. | 395/425 |
| 5,146,589 | 9/1992 | Peet, Jr. et al. | 395/575 |
| 5,155,843 | 10/1992 | Stamm et al. | 395/575 |

FOREIGN PATENT DOCUMENTS

A0145960 6/1985 European Pat. Off.
A3911182 10/1989 Fed. Rep. of Germany.

OTHER PUBLICATIONS

Patent Abstracts of Japan, vol. 9, No. 90 (P-350) Apr. 19, 1985 and JP,A,59 218 693 (Nippon Denshin Denwa Kosha) Dec. 8, 1984.
Kane, "MIPS R2000 RISC Architecture", Prentice-Hall, 1987, pp. 4–1 to 4–7.
Hall et al., "Virtualizing the VAX Architecture", Proc. 18th Int'l. Symp. on Computer Architecture (Assoc. for Comp. Mach.) 1990.

Primary Examiner—Joseph L. Dixon
Assistant Examiner—Matthew M. Kim
Attorney, Agent, or Firm—Arnold, White & Durkee

[57] ABSTRACT

A central processing unit (CPU) executing a virtual memory management system employs a translation buffer for caching recently used page table entries. When more than one process is executing on the CPU, the translation buffer is usually flushed when a context switch is made, even though some of the entries would still be valid for commonly-referenced memory areas. An address space number feature is employed to allow entries to remain in the translation buffer for processes not currently executing, and the separate processes or the operating system can reuse entries in the translation buffer for such pages of memory that are commonly referenced. To allow this, an "address space match" entry in the page table entry signals that the translation buffer content can be used when the address tag matches, even though the address space numbers do not necessarily match. When executing virtual machines on this CPU, with a virtual machine monitor, the address space match feature is employed among processes of a virtual machine, but an additional entry is provided to disable the address space match feature for all address space numbers for the virtual machine monitor.

23 Claims, 8 Drawing Sheets

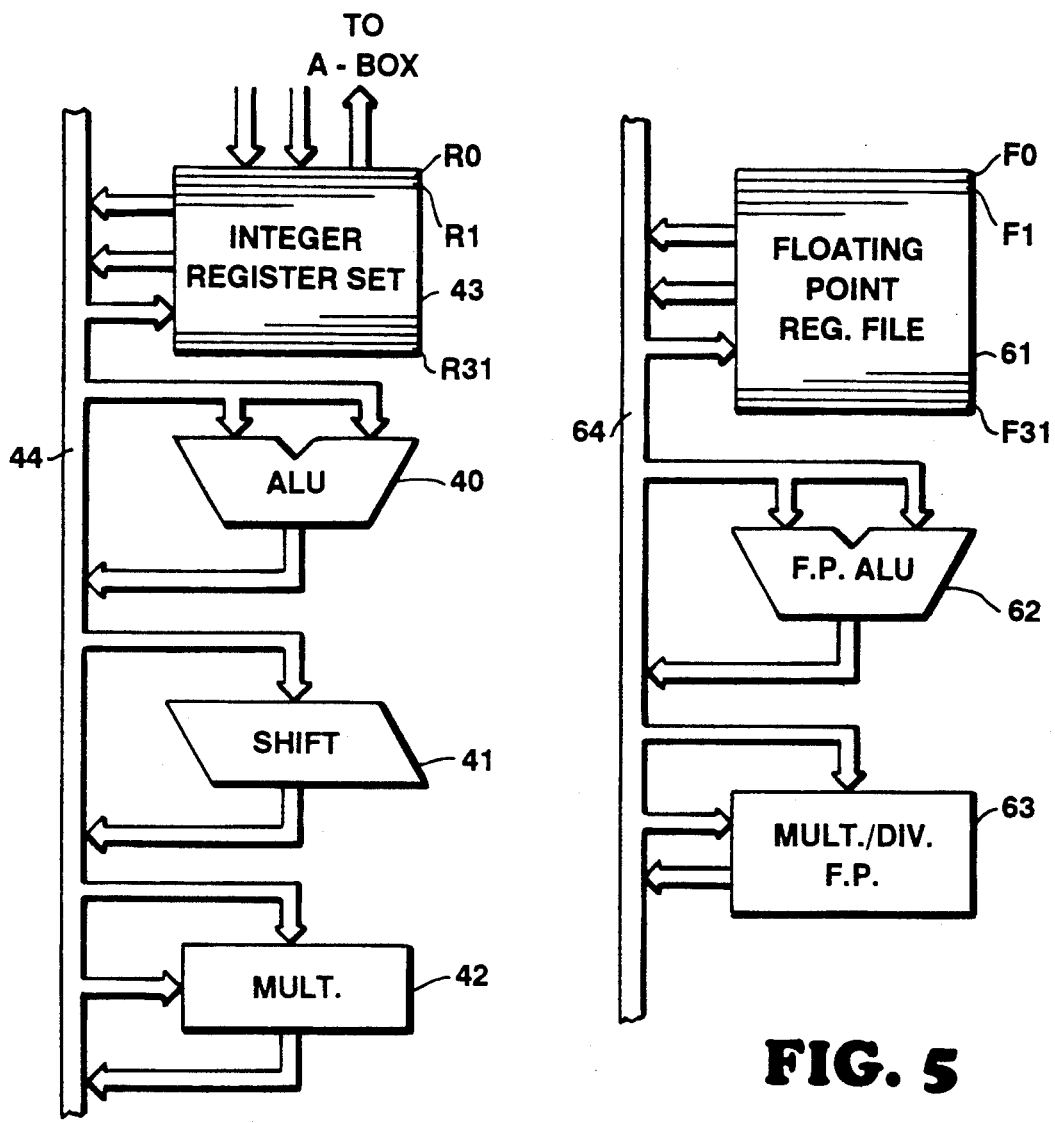
FIG. 3
FIG. 5
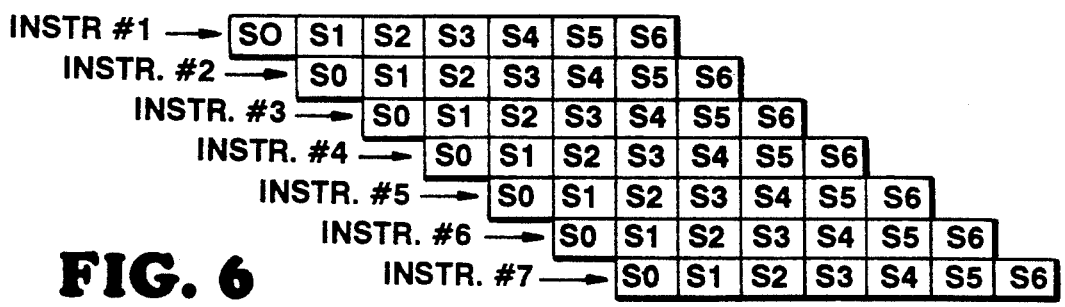
FIG. 6

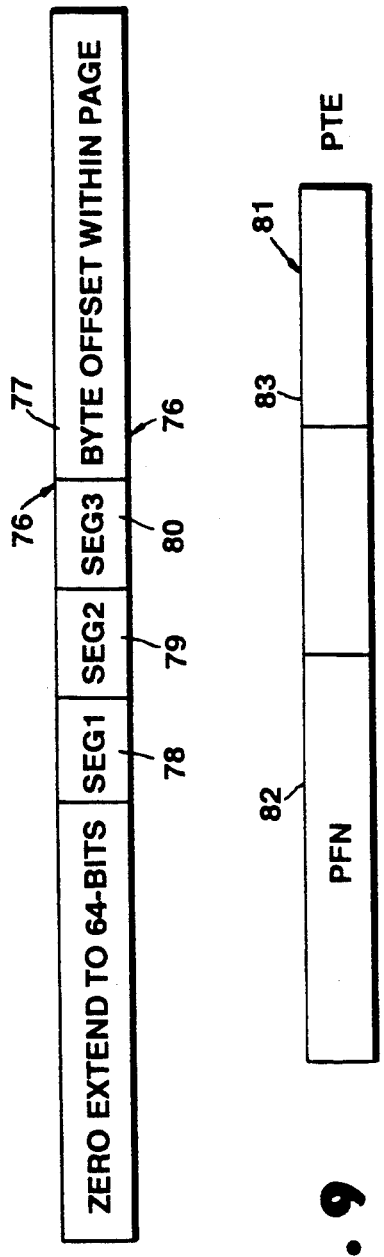
FIG. 8
FIG. 9
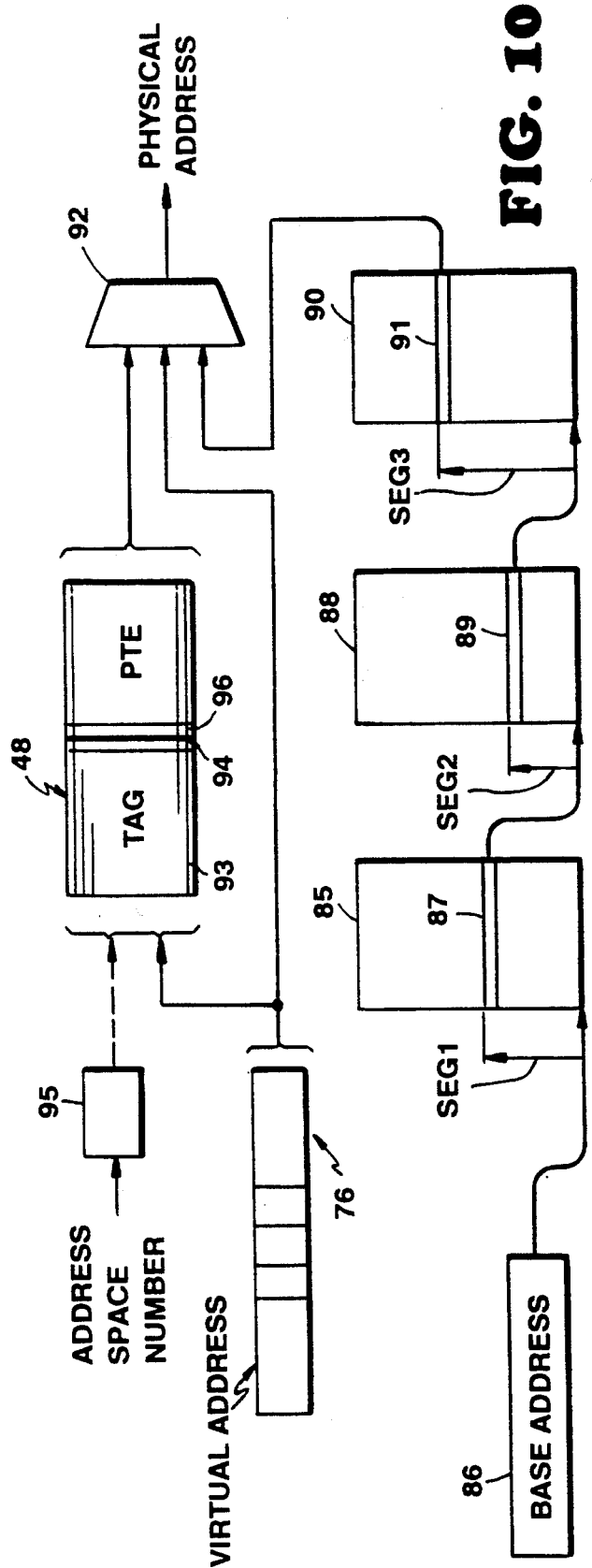
FIG. 10

| ADDRESS SPACE NUMBER | USE |
|---|---|
| 00 | VIRTUAL MACHINE MONITOR |
| 01 | VM A, PROCESS 0 |
| 02 | VM A, PROCESS 1 |
| 03 | VM A, PROCESS 2 |
| 04 | VM A, PROCESS 3 |
| 05 | VM A, PROCESS 4 |
| 06 | VM B, PROCESS 0 |
| 07 | VM B, PROCESS 1 |
| 08 | VM B, PROCESS 2 |
| 09 | VIRTUAL MACHINE MONITOR |
| 10 | VM B, PROCESS 3 |
| 11 | VM B, PROCESS 4 |
| 12 | UNUSED |
| 13 | UNUSED |
| 14 | UNUSED |

TRANSLATION BUFFER FOR VIRTUAL MACHINES WITH ADDRESS SPACE MATCH

RELATED CASES

This application discloses subject matter also disclosed in the following copending application, assigned to Digital Equipment Corporation, the assignee of this invention:

Ser. No. 547,630, filed Jun. 29, 1990, entitled IMPROVING PERFORMANCE IN REDUCED INSTRUCTION SET PROCESSOR, by Richard L. Sites and Richard T. Witek, inventors;

BACKGROUND OF THE INVENTION

This invention relates to digital computers, and more particularly to a virtual memory management system for a central processing unit (CPU) executing multiple processes.

In the above-identified copending application Ser. No. 547,630, a reduced instruction set processor chip is shown which implements a virtual memory management system. A virtual address is translated to a physical address in such a system before a memory reference is executed, where the physical address is that used to access the main memory. The physical addresses are maintained in a page table, indexed by the virtual address, so whenever a virtual address is presented the memory management system finds the physical address by referencing the page table. At a given time, a process executing on such a machine will probably be using only a few pages, and so these most-likely used page table entries are kept in a translation buffer within the CPU chip itself, eliminating the need to make a memory reference to fetch the page table entry.

The page table entries, including those in the translation buffer, contain other information used by the memory management system, such as privilege information, access rights, etc., to provide secure and robust operation. Before a memory reference is allowed, the current state of the processor and the characteristics of the memory reference are checked against information in the page table entry to make sure the memory reference is proper.

A number of processes (tasks) may be executing in a time-shared manner on a CPU at a given time, and these processes will each have their own areas of virtual memory. The operating system itself will contain a number of pages which must be referenced by each one of these processes. The pages thus shared by processes will thus best be kept in main memory rather than swapped out, and also the page table entries for such pages will preferably remain in the translation buffer since continuing reference will be made to these. However, the translation buffer is usually flushed by invalidating all entries when a context switch is made.

A mechanism using so-called "address space numbers" is implemented in a processor to reduce the need for invalidation of cached address translations in the translation buffer for process-specific addresses when a context switch occurs. The address space number (process tag) for the current process is loaded to a register in the processor to become part of the current state; this loading is done by a privileged instruction from a process-specific block in memory. Thus, each process has associated with it an address space number, which is an arbitrarily-assigned number generated by the operating system. This address space number is maintained as part of the machine state, and also stored in the translation buffer for each page entry belonging to that process. When a memory reference is made, as part of the tag match in the translation buffer, the current address space number is compared with the entry in the translation buffer, to see if there is a match. To accommodate sharing of entries, an address space match function can be added to the comparison; a "match" bit in the entry can turn on or off the requirement for matching address space numbers. If turned on, the entry will "match" if the address tags match, regardless of the address space numbers. The operating system can thus load certain page table entries with this match bit on so these pages are shared by all processes.

In operating a CPU using virtual machines, each virtual machine functions as if it were an independent processor, and each virtual machine has a virtual machine operating system and a number of processes running, just as when only one CPU is functioning. Virtual machines are described by Siewiorek et al in "Computer Structures: Principles and Examples" published by McGraw-Hill, 1982, pp. 227-228. To operate these virtual machines, a virtual machine monitor (another execution level) is implemented. As before, there are pages used by the operating system that are used by all of the processes on a virtual machine. Again, performance is improved if entries for the pages remain in the translation buffer when making a context switch between processes or between virtual machines.

The several virtual machines and the virtual machine monitor running on a CPU must have their memory spaces kept separate and isolated from one another, but yet maximize system performance. To this end, the virtual machines and the virtual machine monitor must be able to use the same virtual addresses for different purposes. However, when context switching from one virtual machine to another, or to or from the virtual machine monitor, needlessly flushing entries in the translation buffer which will be used in the new context imposes a performance penalty. Therefore it is important to offer both address space numbers and the match feature when implementing virtual machines.

SUMMARY OF THE INVENTION

In accordance with one embodiment of the invention, a CPU executing a virtual memory management system employs an address space number feature to allow entries to remain in the translation buffer for processes not currently executing, and the separate processes or the operating system can reuse entries in the translation buffer for such pages of memory that are commonly referenced. To allow this, an "address space match" entry in the page table entry signals that the translation buffer content can be used when the address tag matches, even though the address space numbers do not necessarily match. When executing virtual machines on this CPU, with a virtual machine monitor, the address space match feature is employed within a virtual machine, but an additional entry is provided to disable the address space match feature for all address space numbers for the virtual machine monitor. In another embodiment, an additional entry is provided in the translation buffer to restrict the address space match feature to those address spaces associated with a single virtual machine or virtual machine monitor.

BRIEF DESCRIPTION OF THE DRAWINGS

The novel features believed characteristic of the invention are set forth in the appended claims. The invention itself, however, as well as other features and advantages thereof, will be best understood by reference to the detailed description of specific embodiments which follows, when read in conjunction with the accompanying drawings, wherein:

FIG. 3 is an electrical diagram in block form of the integer execution unit or E-box in the CPU of FIG. 1;

FIG. 5 is an electrical diagram in block form of the floating point execution unit or F-box in the CPU of FIG. 1;

FIG. 6 is a timing diagram of the pipelining in the CPU of FIGS. 1-5;

FIG. 8 is a diagram of the format of a virtual address used in the CPU of FIGS. 1-5;

FIG. 9 is a diagram of the format of a page table entry used in the CPU of FIGS. 1-5;

FIG. 10 is a diagram of the address translation mechanism used in the CPU of FIGS. 1-5;

DETAILED DESCRIPTION OF SPECIFIC EMBODIMENT

Figure 1:
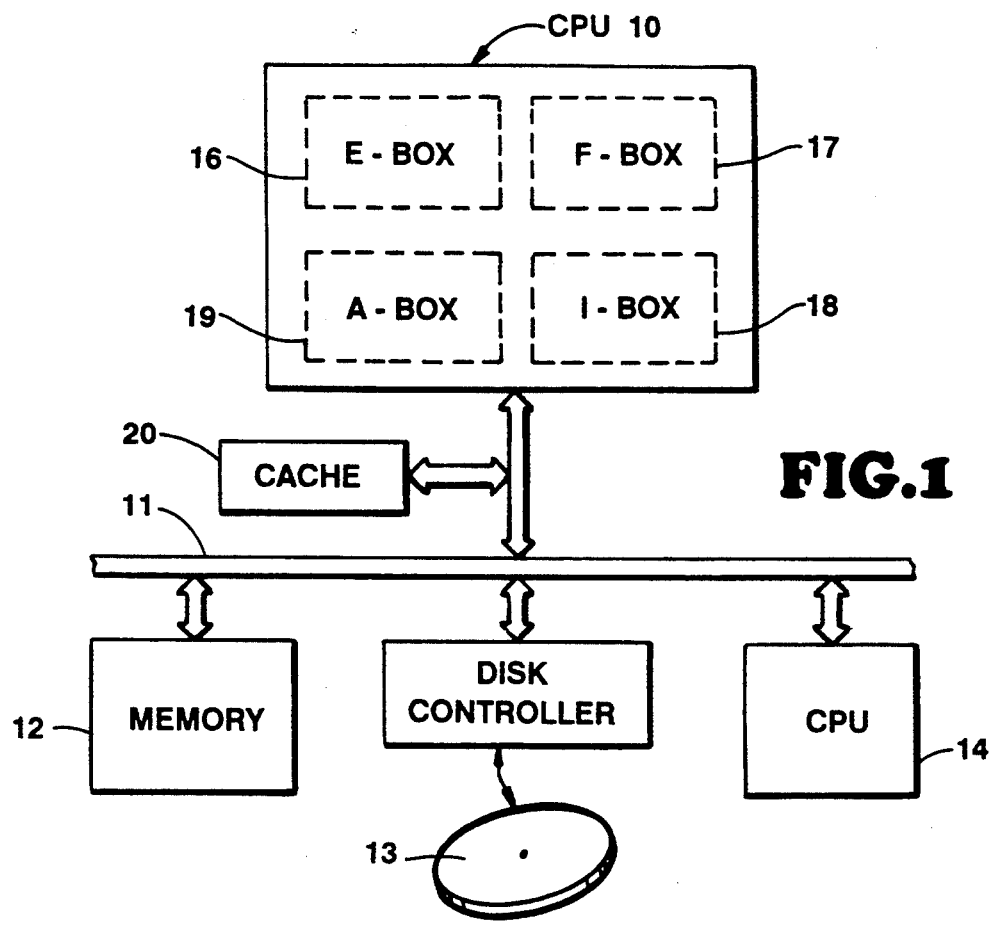
FIG. 1 is an electrical diagram in block form of a computer system having a CPU which may employ features of the invention.

Referring to FIG. 1, a computer system which may use features of the invention, according to one embodiment, includes a CPU 10 connected by a system bus 11 to a main memory 12, with a disk memory 13 also accessed via the system bus 11. The system may use a single CPU, but may also be of a multiprocessor configuration, in which case other CPUs 14 also access the main memory 12 via the system bus 11.

The CPU 10 is of a single-chip integrated circuit device, in an example embodiment, although features of the invention could be employed as well in a processor constructed of integrated circuit devices mounted on boards. Within the single chip an integer execution unit 16 (referred to as the "E-box") is included, along with a floating point execution unit 17 (referred to as the "F-box"). Instruction fetch and decoding is performed in an instruction unit 18 or "I-box". An address unit or "A-box" 19 performs the functions of address generation, memory management, write buffering and bus interface; the virtual address system with translation buffer according to the invention is implemented in the address unit 19. The memory is hierarchical, with on-chip instruction and data caches being included in the instruction unit 18 and address unit 19 in one embodiment, while a larger, second-level cache 20 is provided off-chip, being controlled by a cache controller in the address unit 19.

The CPU 10 employs an instruction set as described in application Ser. No. 547,630, in which all instructions are of a fixed size, in this case 32-bit or one longword. Memory references are generally aligned quadwords, although integer data types of byte, word, longword and quadword are handled internally. As used herein, a byte is 8-bits, a word is 16-bits or two bytes, a longword is 32-bits or four bytes, and a quadword is 64-bits or eight bytes. The data paths and registers within the CPU 10 are generally 64-bit or quadword size, and the memory 12 and caches use the quadword as the basic unit of transfer. Performance is enhanced by allowing only quadword or longword loads and stores.

Figure 2:
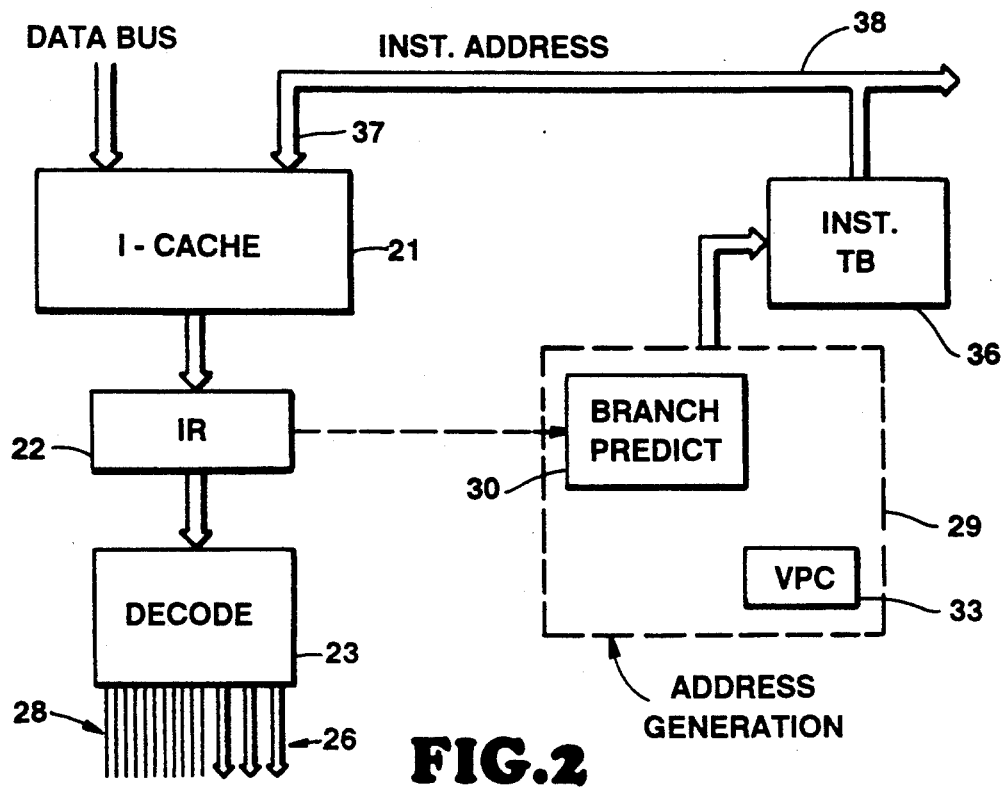
FIG. 2 is an electrical diagram in block form of the instruction unit or I-box of the CPU of FIG. 1.

Referring to FIG. 2, the instruction unit 18 or I-box is shown in more detail. The primary function of the instruction unit 18 is to issue instructions to the E-box 16, A-box 19 and F-box 17. The instruction unit 18 includes an instruction cache 21 which stores perhaps 8 Kbytes of instruction stream data, and this instruction stream data is loaded to an instruction register 22 in each cycle for decoding. In one embodiment, two instructions are decoded in parallel. An instruction is decoded in a decoder 23, producing register addresses on lines 26 and control bits on microcontrol bus 28 to the appropriate elements in the CPU 10.

The instruction unit 18 contains address generation circuitry 29, including a branch prediction circuit 30 responsive to the instructions in the instruction stream to be loaded into register 22. The prediction circuit 30 is used to predict branch addresses and to cause address generating circuitry 29 to prefetch the instruction stream before needed. The virtual PC (program counter) 33 is included in the address generation circuitry 29 to produce addresses for instruction stream data in the selected order.

The instruction unit 18 contains a fully associative translation buffer (TB) 36 to cache recently used instruction-stream address translations and protection information for 8 Kbyte pages. Although 64-bit addresses are nominally possible, as a practical matter 43-bit addresses are adequate. Every cycle the 43-bit virtual program counter 33 is presented to the instruction stream TB 36. If the page table entry (PTE) associated with the virtual address from the virtual PC is cached in the TB 36 then the page frame number (PFN) and protection bits for the page which contains the virtual PC are used by the instruction unit 18 to complete the address translation and access checks. A physical address is thus applied to the address input 37 of the instruction cache 21, or if there is a cache miss then this instruction stream physical address is applied by the bus 38 through the address unit 19 to the cache 20 or memory 12.

The execution unit or E-box 16 is shown in more detail in FIG. 3. The execution unit 16 contains the 64-bit integer execution datapath including an arithmetic/logic unit (ALU) 40, a barrel shifter 41, and an integer multiplier 42. The execution unit 16 also contains the 32-register 64-bit wide register file 43, containing registers R0 to R31, although R31 is hardwired as all zeros. The register file 43 has four read ports and two write ports which allow the sourcing (sinking) of operands (results) to both the integer execution datapath and the address unit 19. A bus structure 44 connects two of the read ports of the register file 43 to the selected inputs of the ALU 40, the shifter 41 or the multiplier 42 as specified by the control bits of the decoded instruction on lines 28 from the instruction unit 18, and connects the output of the appropriate function to one of the write ports of the register file to store the result. That is, the address fields from the instruction are applied by the lines 26 to select the registers to be used in executing the instruction, and the control bits 28 define the operation in the ALU, etc., and define which internal busses of the bus structure 44 are to be used when, etc.

Figure 4:
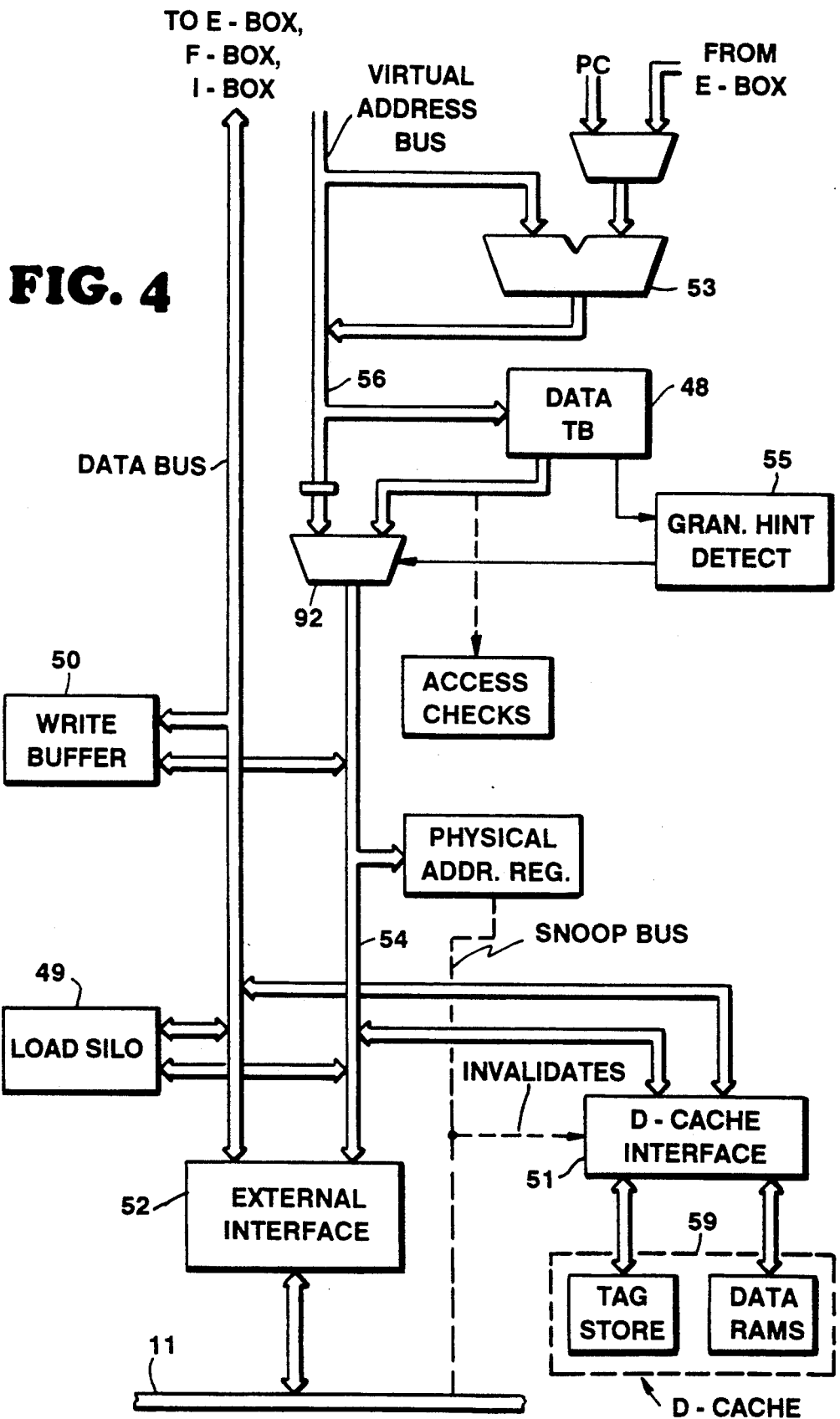
FIG. 4 is an electrical diagram in block form of the addressing unit or A-box in the CPU of FIG. 1.

The A-box or address unit 19 is shown in more detail in FIG. 4. The A-box 19 includes five functions: address translation using a datapath translation buffer 48, a load silo 49 for incoming data, a write buffer 50 for outgoing write data, an interface 51 to a data cache, and the external interface 52 to the bus 11. The address translation datapath has the displacement adder 53 which generates the effective address (by accessing the register file 43 via the second set of read and write ports, and the PC), and the data TB 48 which generates the physical address on address bus 54.

The datapath translation buffer 48 caches a number (e.g., thirty-two) of the recently-used data-stream page table entries (as described below) for pages of 8 Kbyte size. Each entry supports any of four granularity hint block sizes, and a detector 55 is responsive to the granularity hint as described in application Ser. No. 547,630 to change the number of low-order bits of the virtual address passed through from virtual address bus 56 to the physical address bus 54.

For load and store instructions, the effective 43-bit virtual address is presented to TB 48 via bus 56. If the PTE of the supplied virtual address is cached in the TB 48, the PFN and protection bits for the page which contains the address are used by the address unit 19 to complete the address translation and access checks.

The on-chip pipelined floating point unit 17 or F-box as shown in more detail in FIG. 5 is capable of executing both DEC and IEEE floating point instructions according to the instruction set described in application Ser. No. 547,630. The floating point unit 17 contains a 32-entry, 64-bit, floating point register file 61 which includes floating-point registers F0 to F31, and contains a floating point arithmetic and logic unit 62. Divides and multiplies are performed in a multiply/divide circuit 63. A bus structure 64 interconnects two read ports of the register file 61 to the appropriate functional circuit as directed by the control bits of the decoded instruction on lines 28 from the instruction unit 18. The registers selected for an operation are defined by the output bus 26 from the instruction decode. The floating point unit 17 can accept an instruction every cycle, with the exception of floating point divide instructions, which can be accepted only every several cycles. A latency of more than one cycle is exhibited for all floating point instructions, during which the integer unit can continue to execute other instructions.

In an example embodiment, the CPU 10 has an 8 Kbyte data cache 59, and 8 Kbyte instruction cache 21, with the size of the caches depending on the available chip area. The on-chip data cache 59 is write-through, direct mapped, read-allocate physical cache and has 32-byte (1-hexaword) blocks. The system may keep the data cache 59 coherent with memory 12 by using an invalidate bus, not shown.

The instruction cache 21 may be 8 Kbytes, or 16 Kbytes, for example, or may be larger or smaller, depending upon die area. Although described above as using physical addressing with a TB 36, it may also be a virtual cache, in which case it will contain no provision for maintaining its coherence with memory 12. If the cache 21 is a physical addressed cache the chip will contain circuitry for maintaining its coherence with memory: (1) when the write buffer 50 entries are sent to the bus interface 52, the address will be compared against a duplicate instruction cache 21 tag, and the corresponding block of instruction cache 21 will be conditionally invalidated; (2) the invalidate bus will be connected to the instruction cache 21.

The main data paths and registers in the CPU 10 are all 64-bits wide. That is, each of the integer registers 43, as well as each of the floating point registers 61, is a 64-bit register, and the ALU 40 has two 64-bit inputs 40a and 40b and a 64-bit output 40c. The bus structure 44 in the execution unit 16, which actually consists of more than one bus, has 64-bit wide data paths for transferring operands between the integer registers 43 and the inputs and output of the ALU 40. The instruction decoder 23 produces register address outputs 26 which are applied to the addressing circuits of the integer registers 43 and/or floating point registers 61 to select which register operands are used as inputs to the ALU 41 or 62, and which of the registers 43 or registers 61 is the destination for the ALU (or other functional unit) output.

A feature of the CPU 10 of FIGS. 1-6 of this example embodiment is its RISC characteristic. The instructions executed by this CPU 10 are always of the same size, in this case 32-bits, instead of allowing variable-length instructions. The instructions execute on average in one machine cycle (pipelined as described below, and assuming no stalls), rather than a variable number of cycles. The instruction set includes only register-to-register arithmetic/logic type of operations, or register-to-memory (or memory-to-register) load/store type of operations, and there are no complex memory addressing modes such as indirect, etc. An instruction performing an operation in the ALU 40 always gets its operands from the register file 43 (or from a field of the instruction itself) and always writes the result to the register file 43; these operands are never obtained from memory and the result is never written to memory in the same instruction that performs the ALU operation. Loads from memory are always to a register in register files 43 or 61, and stores to memory are always from a register in the register files.

Referring to FIG. 6, the CPU 10 has a seven stage pipeline for integer operate and memory reference instructions. FIG. 6 is a pipeline diagram for the pipeline of execution unit 16, instruction unit 18 and address unit 19. The floating point unit 17 defines a pipeline in parallel with that of the execution unit 16, but ordinarily employs more stages to execute. The seven stages are referred to as S0-S6, where a stage is to be executed in one machine cycle (clock cycle). The first four stages S0, S1, S2 and S3 are executed in the instruction unit 18, and the last three stages S4, S5 and S6 are executed in one or the other of the execution unit 16 or address unit 19, depending upon whether the instruction is an operate or a load/store.

The first stage S0 of the pipeline is the instruction fetch or IF stage, during which the instruction unit 18 fetches new instructions from the instruction cache 21, using the PC 33 address as a base. The second stage S1 is the evaluate stage, during which two fetched instructions are evaluated to see if dual issue is possible. The third stage S2 is the decode stage, during which the instructions are decoded in the decoder 23 to produce the control signals 28 and register addresses on lines 26. The fourth stage S3 is the register file 43 access stage for operate instructions, and the instruction issue stage. The fifth stage S4 is cycle-one of the computation (in ALU 40, for example) if it is an operate instruction, and also the instruction unit 18 computes the new PC 33 in address generator 29; if it is a memory reference instruction the address unit 19 calculates the effective data stream address using the adder 53. The sixth stage S5 is cycle-two of the computation (e.g., in ALU 40) if it is an operate instruction, and also the data TB 48 lookup stage for memory references. The last stage S6 is the write stage for operate instructions having a register write, during which, for example, the output 40c of the ALU 40 is written to the register file 43 via the write port, and is the data cache 59 or instruction cache 21 hit/miss decision point for instruction stream or data stream references.

Figure 7:
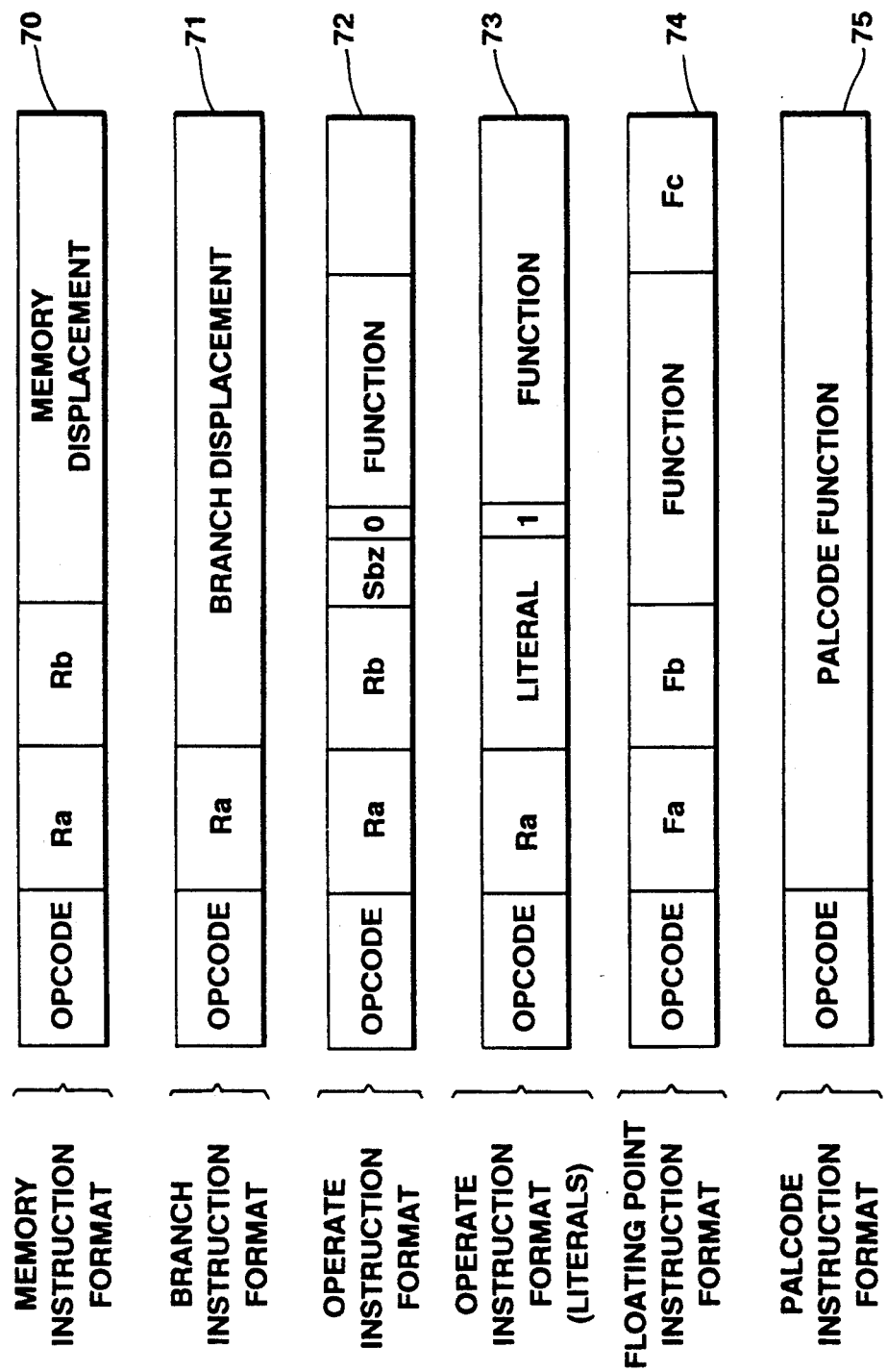
FIG. 7 is a diagram of the instruction formats used in the instruction set of the CPU of FIGS. 1-5.

Referring to FIG. 7, the formats of the various types of instructions of the instruction set executed by the CPU 10 of FIGS. 1–7 are illustrated. Using the instruction formats of FIG. 7, the CPU of FIG. 1 executes an instruction set which includes nine types of instructions. These include (1) integer load and store instructions, (2) integer control instructions, (3) integer arithmetic, (4) logical and shift instructions, (5) byte manipulation, (6) floating point load and store, (7) floating point control, (8) floating point arithmetic, and (9) miscellaneous. The instruction set is described in more detail in application Ser. No. 547,630.

One type is a memory (i.e., load and store) instruction 70, which contains a 6-bit opcode in bits <31:26>, two 5-bit register address fields Ra and Rb in bits <25:21> and <20:16>, and a 16-bit signed displacement in bits <15:0>. This instruction is used to transfer data between registers 43 and memory (memory 12 or caches 59 or 20), to load an effective address to a register of the register file 43, and for subroutine jumps. The displacement field <15:0> is a byte offset; it is sign-extended and added to the contents of register Rb to form a virtual address. The virtual address is used as a memory load/store address or a result value depending upon the specific instruction.

The branch instruction format 71 is also shown in FIG. 7, and includes a 6-bit opcode in bits <31:26>, a 5-bit address field in bits <25:21>, and a 21-bit signed branch displacement in bits <20:0>. The displacement is treated as a longword offset, meaning that it is shifted left two bits (to address a longword boundary), sign-extended to 64-bits and added to the updated contents of PC 33 to form the target virtual address (overflow is ignored).

The operate instructions 72 and 73 are of the formats shown in FIG. 7, one format 72 for three register operands and one format 73 for two register operands and a literal. The operate format is used for instructions that perform integer register operations, allowing two source operands and one destination operand in register file 43. One of the source operands can be a literal constant. Bit-12 defines whether the operate instruction is for a two source register operation or one source register and a literal. In addition to the 6-bit opcode at bits <31:26>, the operate format has a 7-bit function field at bits <11:5> to allow a wider range of choices for arithmetic and logical operation. The source register Ra is specified in either case at bits <25:21>, and the destination register Rc at <4:0>. If bit-12 is a zero, the source register Rb is defined at bits <20:16>, while if bit-12 is a one then an 8-bit zero-extended literal constant is formed by bits <20:13> of the instruction. This literal is interpreted as a positive integer in the range 0–255, and is zero-extended to 64-bits.

FIG. 7 also illustrates the floating point operate instruction format 74, used for instructions that perform floating point register 61 to floating point register 61 operations. The floating point operate instructions contain a 6-bit opcode at bits <31:26> as before, along with an 11-bit function field at bits <15:5>. There are three operand fields, Fa, Fb and Fc, each specifying either an integer or a floating-point operand as defined by the instruction; only the registers 61 are specified by Fa, Fb and Fc, but these registers can contain either integer or floating-point values. Literals are not supported. Floating point conversions use a subset of the floating point operate format 74 of FIG. 7 and perform register-to-register conversion operations; the Fb operand specifies the source and the Fa operand should be reg-31 (all zeros).

The other instruction format 75 of FIG. 7 is that for privileged architecture library (PAL or PALcode) instructions, which are used to specify extended processor functions. In these instructions a 6-bit opcode is present at bits <31:26> as before, and a 26-bit PALcode function field <25:0> specifies the operation. The source and destination operands for PALcode instructions are supplied in fixed registers that are specified in the individual instruction definitions. A PALcode instruction usually uses a number of instructions of formats 70–74 stored in memory to make up a more complex instruction which is executed in a privileged mode, as part of the operating system, for example.

The six-bit opcode field <31:26> in the instruction formats of FIG. 7 allows only $2^6$ or sixty-four different instructions to be coded. Thus the instruction set would be limited to sixty-four. However, the "function" fields in the instruction formats 72, 73 and 74 allow variations of instructions having the same opcode in bits <31:26>. Also, the "hint" bits in the jump instruction allow variations such as JSR or RET.

Referring to FIG. 8, the format 76 of the virtual address asserted on the internal address bus 56 is shown. This address is nominally 64-bits in width, but of course practical implementations at present use much smaller addresses. For example, an address of 43-bits provides an addressing range of 8-Terabytes. The format includes a byte offset 77 of, for example, 13-bits to 16-bits in size, depending upon the page size employed. If pages are 8-Kbytes, the byte-within-page field 77 is 13-bits, while for 16-Kbyte pages the field 77 is 14-bits. The format 76 as shown includes three segment fields 78, 79 and 80, labelled Seg1, Seg2 and Seg3, also of variable size depending upon the implementation. The segments Seg1, Seg2, and Seg3 can be 10-to-13 bits, for example. If each segment size is 10-bits, then a segment defined by Seg3 is 1K pages in length, a segment for Seg2 is 1M pages, and a segment for Seg1 is 1 G pages. The page frame number (PFN) field in the PTE is always 32-bits wide; thus, as the page size grows the virtual and physical address size also grows.

The physical addresses are at most 48-bits, but a processor may implement a smaller physical address space by not implementing some number of high-order bits. The two most significant implemented physical address bits select a caching policy or implementation-dependent type of address space. Different implementations may put different uses and restrictions on these bits as appropriate for the system. For example, in a workstation with a 30-bit <29:0> physical address space, bit <29> may select between memory and I/O, and bit <28> may enable or disenable caching in I/O space and must be zero in memory space.

Typically, in a multitasking system, several processes may reside in physical memory 12 (or caches) at the same time, so memory protection and multiple address spaces (using address space numbers) are used by the CPU 10 to ensure that one process will not interfere with either other processes or the operating system. To further improve software reliability, four hierarchical access modes (privilege modes) provide memory access control. They are, from most to least privileged: kernel, executive, supervisor, and user, referring to operating system modes and application programs. Protection is specified at the individual page level, where a page may be inaccessible, read-only, or read/write for each of the four access modes. Accessible pages can be restricted to have only data or instruction access.

A page table entry or PTE 81, as stored in the translation buffers 36 or 48 or in the page tables set up in the memory 12 by the operating system, is illustrated in FIG. 9. The PTE 81 is a quadword (64-bits) in width, and includes a 32-bit page frame number or PFN 82 at bits <63:32>, as well as certain software and hardware control information in a field 83 having bits <15:0> as set forth in Table A to implement the protection features and the like.

The translation buffers 36 and 48 store a number of the page table entries 81, each associated with a tag consisting of certain high-order bits of the virtual address to which this PFN is assigned by the operating system. For example, the tag may consist of the fields 78, 79 and 80 for the Seg1, Seg2 and Seg3 values of the virtual address 76 of FIG. 8. In addition, each entry contains a valid bit, indicating whether or not the entry has been invalidated, as when the TB is flushed. It is conventional to flush the TB when a context switch is made, invalidating all the entries; the features of the invention, however, allow continued use of entries still useful, so performance is improved. To this end, the translation buffers 36 and 48 include in addition an address space number field, perhaps sixteen bits in width, loaded from the process control block as will be described.

Referring to FIG. 10, the virtual address 76 on the bus 56 (seen in FIG. 8) is used to search for tag match for a PTE in the translation buffer, and, if not found, then Seg1 field 78 is used to index into a first page table 85 found at a base address stored in an internal register 86 referred to as the page table base register. The entry 87 found at the Seg1 index in table 85 is the base address for a second page table 88, for which the Seg2 field 79 is used to index to an entry 89. The entry 89 points to the base of a third page table 90, and Seg3 field 80 is used to index to a PTE 91. The physical page frame number from PTE 91 is combined with the byte offset 77 from the virtual address, in adder 92, to produce the physical address on bus 54. As mentioned above, the size of the page mapped by a PTE, along with size of the byte offset 77, can vary depending upon the granularity hint.

According to the invention, in addition to matching the tag field of the virtual address 76 with the tag field 93 of the translation buffer 36 or 48, an address space number 94 stored in the translation buffer is compared to the address space number in the current state of the CPU 10, stored in an ASN register 95 which is one of the internal processor registers. If the address space match field (bit <4>, Table A) is clear (zero), the current ASN and the field 94 must match for the PTE to be used, but if set (logic one) then there need not be a match, i.e., the address space numbers are ignored. A particular feature of the invention, however, is an additional match-disable bit 96 stored for each PTE, disabling the address space match feature under certain conditions (i.e., when the virtual machine monitor process is being executed).

The match-disable bit is not required to be maintained on each entry in the translation buffer. Whether or not address-space matches should be disabled is properly a function of the execution environment of the CPU rather than of the virtual address. When the virtual machine monitor is being executed (as discussed below), address-space matches are disabled; when a virtual machine or some process in a VM is being executed, address-space matches are enabled. In another embodiment of the invention, the match-disable bit could be stored globally in the translation buffer. In yet another embodiment of the invention, the match-disable bit could be maintained in the CPU itself. In either case, its value would be changed on transition from the VMM to a VM or from a VM to the VMM, and its current value must be made available to the match comparison logic in the translation buffer.

Figure 11:
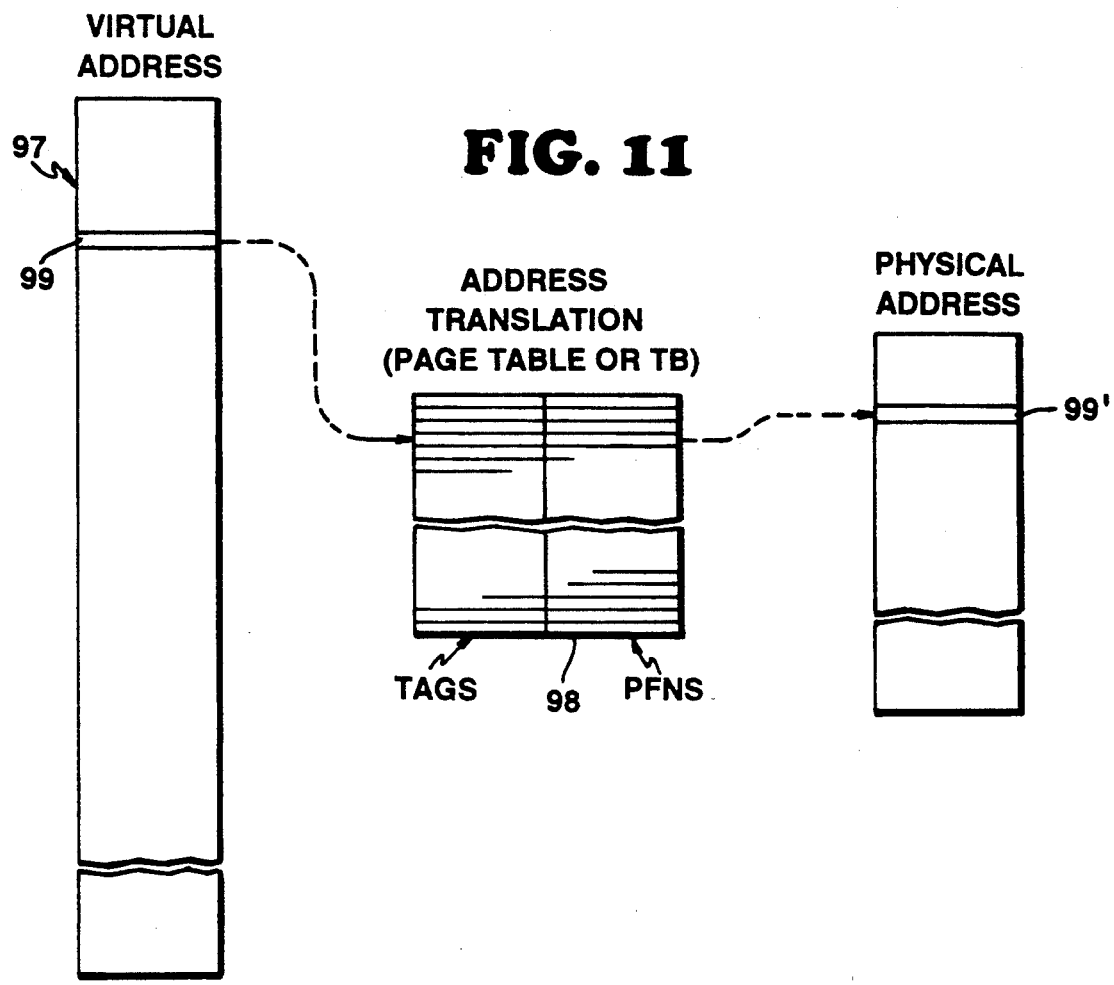
FIG. 11 is a diagram of the virtual-to-physical address mapping used in the system of FIGS. 1-5.

The CPU 10 generates memory references by first forming a virtual address 76 on bus 56, representing the address within the entire virtual range 97 as seen in FIG. 11, defined by the 43-bit address width referred to, or that portion of the address width used by the operating system. Then using the page tables 85, 88, 90 in memory, or the translation buffer 36 or 48, the virtual address is translated to a physical address represented by an address map 98; the physical memory is constrained by the size of the main memory 12. The translation is done for each page (e.g., an 8 Kbyte block), so a virtual page address for a page 99 in the virtual memory map 97 is translated to a physical address 99' for a page (referred to as a page frame) in the physical memory map 98. The page tables are maintained in memory 12 or cache 20 to provide the translation between virtual address and physical address, and the translation buffer is included in the CPU to hold the most recently used translations so a reference to the page tables in memory 12 need not be made in most cases to obtain the translation before a data reference can be made; the time needed to make the reference to a page table in memory 12 would far exceed the time needed to obtain the translation from the translation buffer. Only the pages used by tasks currently executing (and the operating system itself) are likely to be in the physical memory 12 at a given time; a translation to an address 99' is in the page table 85, 88, 90 for only those pages actually present in physical memory 12. When the page being referenced by the CPU 10 is found not to be in the physical memory 12, a page fault is executed to initiate a swap operation in which a page from the physical memory 12 is swapped with the desired page maintained in the disk memory 13, this swap being under control of the operating system. Some pages in physical memory 12 used by the operating system kernel, for example, or the page tables 85, 88, 90 themselves, are in fixed positions and may not be swapped to disk 13 or moved to other page translations; most pages used by executing tasks, however, may be moved freely within the physical memory 12 by merely keeping the page tables updated.

Figure 12:
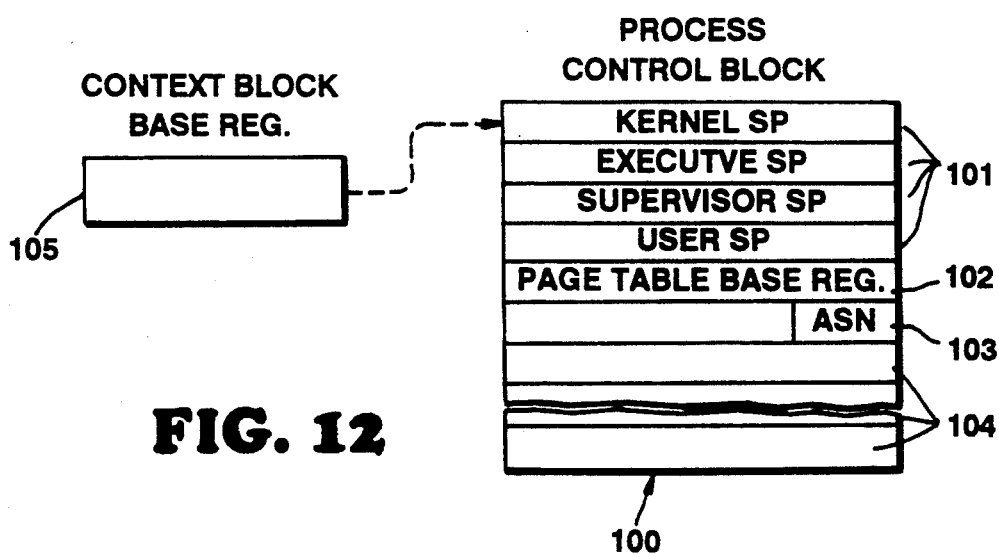
FIG. 12 is a diagram of a process control block used in the system of FIGS. 1-5.

A process (or task) is a basic entity that is scheduled for execution by the CPU 10. A process represents a single thread of execution and consists of an address space and both hardware and software context. The hardware context is defined by the integer registers 43 and floating point registers 61, the processor status contained in internal processor registers, the program counter 33, four stack pointers, the page table base register 86, the address space number 95, and other values depending upon the CPU design. The software context of a process is defined by operating system software and is system dependent. A process may share the same address space with other processes or have an address space of its own; there is, however, no separate address space for system software, and therefore the operating system must be mapped into the address space of each process. In order for a process to execute, its hardware context must be loaded into the integer registers 43, floating point registers 61, and internal processor registers. While a process is executing, its hardware context is continuously updated, as the various registers are loaded and written over. When a process is not being executed, its hardware context is stored in memory 12. Saving the hardware context of the current process in memory, followed by loading the hardware context for a new process, is referred to as context switching. Context switching occurs as one process after another is scheduled by the operating system for execution. The hardware context of a process is defined by a privileged part and nonprivileged part. The privileged part is stored in memory in a 128-byte block 100 as shown in FIG. 12 when a process is not executing, and context is switched by a privileged instruction. There is one block 100 for each process. The nonprivileged part is context switched by the operating system software.

Referring to FIG. 12, the context block 100 contains four stack pointers in fields 101, these being stack pointers for the kernel, the executive, the supervisor and the user. The page table base register 86 is in field 102. The address space number for this process (to be loaded to register 95) is in field 103. Other fields 104 are for values not material here. The location of this block 100 in memory is specified for the current process by a context block base register 105. A swap context instruction saves the privileged context of the current process into the context block specified by this register 105, loads a new value into the register 105, and then loads the privileged context of the new process from the new block 100 into the appropriate hardware registers 43, etc.

The architecture as described above allows a processor to implement address space numbers (process tags) to reduce the need for invalidation of cached address translations in the translation buffer for process-specific addresses when a context switch occurs. The address space number for the current process is loaded by a privileged instruction from field 103 into an internal processor register 95.

In the page table entry 81 of FIG. 9 and Table A, there is a field (bit <4>) called "address space match." This feature allows an operating system to designate locations in the system's virtual address space 97 which are shared among all processes. Such a virtual address refers to the same physical address in each process's address space.

The CPU 10 of FIGS. 1-5 may employ a "virtual machine system" which uses a combination of hardware, firmware, and software mechanisms to create the illusion of multiple, independent simulated or virtual computers each running on the same physical computer. Virtual machine systems create a set of virtual machines (VMs) in an analogous fashion to how time sharing systems create a set of independent user processes. In virtualizing the architecture of FIG. 1-5, it is desirable from performance and functional standpoints to provide the address-space-match feature to virtual machines through hardware means.

Virtual machines are created by a layer executing on the CPU called the virtual machine monitor (VMM). The VMM is in control of the hardware, including memory management (address translation and protection mechanisms) and the page tables. Each virtual machine runs in a separate virtual address space in the range 97, and has a distinct set of address space numbers assigned by the VMM. The VMM also runs in its own, independent set of virtual address spaces in the range 97.

The purpose of the invention is to maximize system performance, while allowing the virtual machines to run in kernel mode so they can execute privileged instructions (otherwise they would have to use traps for these operations, at considerable performance penalty); to do this the VMM must constrain the VMs. The problem addressed in implementing this invention is to keep the address spaces of the several VMs and the VMM itself separate from each other, while at the same time maximizing system performance by providing the match function in the TB to the VMs. A further constraint on the solution is that it is expected that the VMs and the VMM will use the same virtual addresses for different purposes. Thus, it is not a solution to allocate separate address regions to the VMM from those allocated to the VMs.

Figures 13, 15:
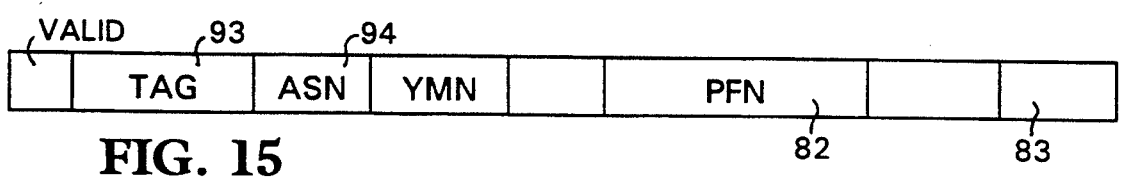
FIG. 13 is a table of address space numbers for an example of operating the system of FIGS. 1-5 with virtual machines.
FIG. 15 is a diagram of a translation buffer entry for another embodiment of the invention.

To describe this invention, an example is illustrative. Suppose that the hardware provides fifteen address spaces for use by software, numbered ASN-0 through ASN-14. Assume that address spaces ASN-0 and ASN-9 are dedicated for use by the VMM. On this example system, there are running two virtual machines, A and B, each of which is running five user processes. One possible assignment of address spaces to this mix would be to dedicate address spaces ASN-1 through ASN-5 to VM A and address spaces ASN-6, -7, -8, -10, and -11 to VM B. This example is illustrated in FIG. 13.

To preserve system security and integrity, it is required that the two virtual machines be completely independent. That means that they cannot reference each other's memory. Similarly, the VMM's memory must also be isolated from the virtual machines. However, within a virtual machine, the address-space-match feature should work correctly, allowing the individual processes to share memory, under control of each VM's operating system.

A straightforward translation buffer design assigns each address space an address space number (ASN). Part of the CPU's state information is the ASN assigned to the currently running entity or process, register 95. TB entries are tagged in field 94 with the ASN of the address space to which they belong. In addition, there is a bit or field in the TB (Table A, ASM bit <4>) which indicates that the entry matches any address space, in effect overriding the ASN tag 94.

This kind of TB can be used in a virtual machine system at a considerable performance penalty. In order to enforce the memory isolation requirements, the TB must be completely flushed whenever (1) there are any entries in the TB that have the match field (bit <4>) indicating match all, and (2) any of the following events occurs: (a) the currently executing entity on the real machine changes from one VM to another VM, (b) the currently executing entity on the real machine changes from some VM to the VMM, or (c) the currently executing entity on the real machine changes from the VMM to any VM.

To minimize the TB flushes, and thus improve overall system performance, some restriction is imposed on the VMM and the TB construction is changed, according to the invention. The restriction imposed on the VMM is to require it to use the disable match feature. This reserves the address space match feature for use by the virtual machines, and guarantees that no VMM address will be mapped by the TB with the match field set.

The TB itself is modified by adding another piece of CPU state called "disable match" which is the field 96 of FIG. 10. The VMM determines the value of the disable match field 96 on a per-address-space basis and forwards the current value to the TB. The field 96 is a flag that can be either set or clear. If the disable match field 96 is clear, the TB will match a reference if the address is correct and (1) the ASN in the TB entry matches the CPU's current ASN, or (2) the match field in the TB entry is set.

Figure 14:
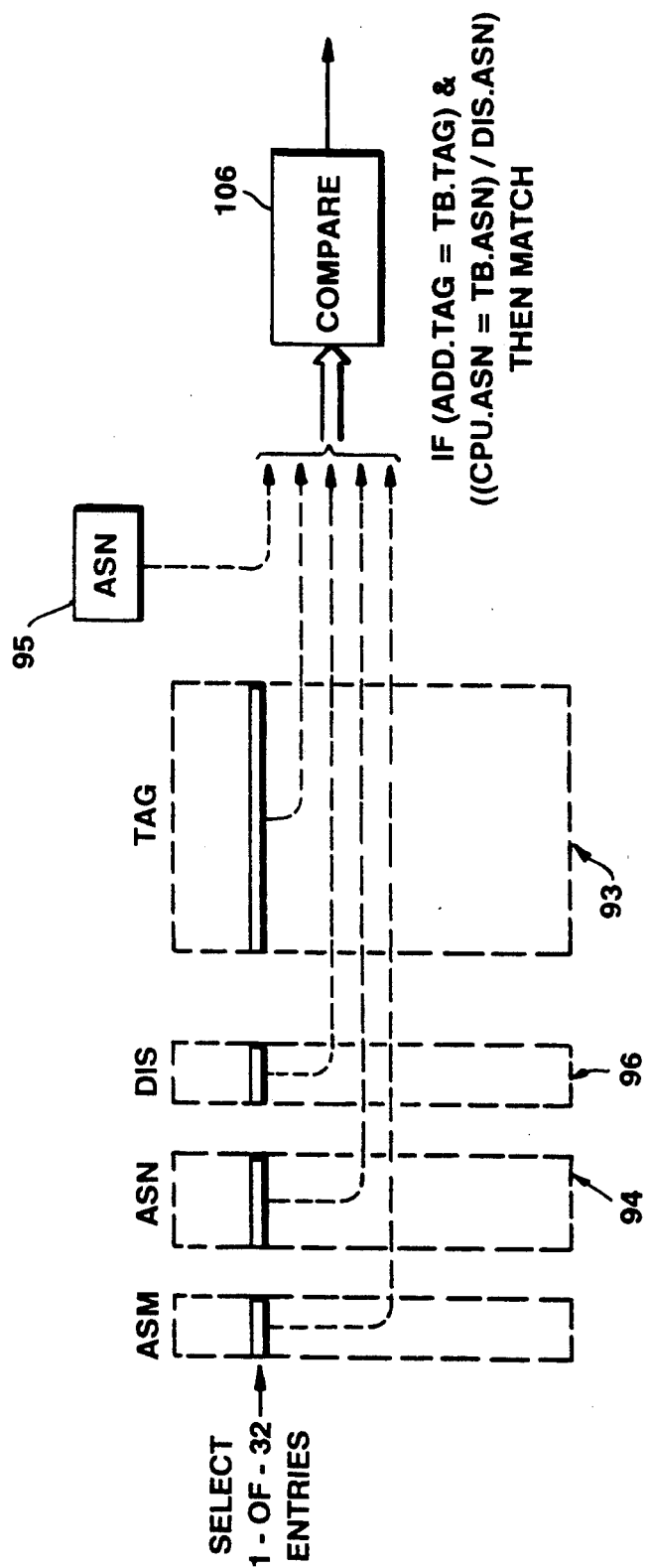
FIG. 14 is a diagram of the evaluation mechanism for translation buffer entries using the features of the invention.

Referring to FIG. 14, the logic implemented according to the invention may be illustrated by the relationship:

IF (ADDR.TAG = TB.TAG) & ((CPU.ASN = TB.ASN) | (TB.ASM & NOT TB.DIS))
THEN MATCH where ADDR.TAG is the tag fields 78, 79, 80 of the virtual address 76, TB.TAG is the tag 93 in the translation buffer, CPU.ASN is the value stored in the processor register 95 from the field 103 of the control block, TB.ASN is the address space number stored in the field 96 of the translation buffer, TB.ASM is the match bit, and TB.DIS is the diable bit in field 96 of the translation buffer. These values are applied to a logic circuit 106 in the A-box of FIG. 4 to generate a match signal to indicate whether or not the PTE selected in the TB is to be used.

The logic implemented in the circuit 106 and given in the preceding paragraph in equation form may also be expressed a truth table as follows (in each case assuming the address tags match):

| TB.ASN = CPU.ASN? | TB.ASM? | TB.DIS? | Match? |
|---|---|---|---|
| Y | F | F | Match |
| Y | F | T | Match |
| Y | T | F | Match |
| Y | T | T | Match |
| N | F | F | Don't Match |
| N | F | T | Don't Match |
| N | T | F | Match |

-continued

| TB.ASN = CPU.ASN? | TB.ASM? | TB.DIS? | Matcl ? |
|---|---|---|---|
| N | T | T | Don't Match |

If the disable match field 96 is set, the TB will match a reference only if the address is correct and the ASN 94 in the TB entry matches the CPU's current ASN 95. In effect, the disable match state bit 96 overrides the match field in the TB.

To use the modified design, the VMM causes the disable match bit 96 to be set for all ASNs that are dedicated to the VMM itself (ASN-0 and ASN-9 in the example above), and the VMM causes the disable match bit 96 to be clear for all other ASNs. One key feature of the disable match bit 96 is that its value is constant as long as the CPU executes in the same context, either the VMM or the same VM/process pair. So, the bit's value need not be calculated during a memory reference. Instead, depending on specific TB design, the value can be calculated and loaded when a TB entry is being filled or when the CPU changes context. The result of the modified design according to the invention is that the TB need be flushed only when the currently executing entity on the machine changes from one VM to another VM.

In another embodiment of the invention, a multi-bit field for a virtual machine number VMN is added to each translation buffer entry as seen in FIG. 15, instead of the single-bit disable indicator as discussed above. Likewise, a multi-bit virtual machine number VMN is added to the state of the CPU in an internal processor register, like the address space number field 95. The translation buffer then contains logic to match a virtual address on the tags and match the ASNs, as before, and also logic to match on the virtual machine numbers. The logic implemented may be expressed IF (ADDR.TAG = TB.TAG) & (CPU.VMN = TB.VMN) & ((CPU.ASN = TB.ASN) | (TB.ASM))
THEN MATCH where CPU.VMN is the virtual machine number stored as machine state and TB.VMN is the VMN field in the translation buffer entry.

In this embodiment, each VM is assigned one (or more) VMN, and the VMM is assigned one (or more) VMN, and each must maintain operation using a VMN distinct to itself. In contrast to the previous embodiment, however, the translation buffer does not need to be cleared upon any switch between VMs. An additional advantage is the virtual machine monitor can use the address space match to share translation buffer entries among its processes. The disadvantage of this embodiment is that more bits are needed in the translation buffer entries.

While this invention has been described with reference to specific embodiments, this description is not meant to be construed in a limiting sense. Various modifications of the disclosed embodiments, as well as other embodiments of the invention, will be apparent to persons skilled in the art upon reference to this description. It is therefore contemplated that the appended claims will cover any such modifications or embodiments as fall within the true scope of the invention.

TABLE A

Page Table Entry
Fields in the page table entry are interpreted as follows:

| Bits | Description |
|---|---|
| <0> | Valid (V) - Indicates the validity of the PFN field. |
| <1> | Fault On Read (FOR) - When set, a Fault On Read exception occurs on an attempt to read any location in the page. |
| <2> | Fault On Write (FOW) - When set, a Fault On Write exception occurs on an attempt to write any location in the page. |
| <3> | Fault on Execute (FOE) - When set, a Fault On Execute exception occurs on an attempt to execute an instruction in the page. |
| <4> | Address Space Match (ASM) - When set, this PTE matches all Address Space Numbers. For a given VA, ASM must be set consistently in all processes. |
| <6:5> | Granularity hint (GH) - Software may set these bits to a non-zero value to supply a hint to the translation buffer that a block of pages can be treated as a single larger page. |
| <7> | Reserved for future use. |
| <8> | Kernel Read Enable (KRE) - This bit enables reads from kernel mode. If this bit is a 0 and a LOAD or instruction fetch is attempted while in kernel mode, an Access Violation occurs. This bit is valid even when V = 0. |
| <9> | Executive Read Enable (ERE) - This bit enables reads from executive mode. If this bit is a 0 and a LOAD or instruction fetch is attempted while in executive mode, an Access Violation occurs. This bit is valid even when V = 0. |
| <10> | Supervisor Read Enable (SRE) - This bit enables reads from supervisor mode. If this bit is a 0 and a LOAD or instruction fetch is attempted while in supervisor mode, an Access Violation occurs. This bit is valid even when V = 0. |
| <11> | User Read Enable (URE) - This bit enables reads from user mode. If this bit is a 0 and a LOAD or instruction fetch is attempted while in user mode, an Access Violation occurs. This bit is valid even when V = 0. |
| <12> | Kernel Write Enable (KWE) - This bit enables writes from kernel mode. If this bit is a 0 and a STORE is attempted while in kernel mode, an Access Violation occurs. This bit is valid even when V = 0. |
| <13> | Executive Write Enable (EWE) - The bit enables writes from executive mode. If this bit is a 0 and a STORE is attempted while in executive mode, an Access Violation occurs. |
| <14> | Supervisor Write Enable (SWE) - This bit enables writes from supervisor mode. If this bit is a 0 and a STORE is attempted while in executive mode, an Access Violation occurs. |
| <15> | User Write Enable (UWE) - This bit enables writes from user mode. If this bit is a 0 and a STORE is attempted while in user mode, Access Violation occurs. |
| <31:16> | Reserved for software. |
| <63:32> | Page Frame Number (PFN) - The PFN field always points to a page boundary. If V is set, the PFN is concatenated with the Byte Within Page bits of the virtual address to obtain the physical address. If V is clear, this field may be used by software. |

What is claimed is:

1. A method of operating a processor having a translation buffer for translating a virtual address to a physical address, said method comprising the steps of:

storing in said translation buffer a plurality of page table entries, each page table entry containing a page frame number indexed by a virtual address tag;

also storing in said translation buffer for each said page table entry an address space number, and storing in said translation buffer for each said page table entry an address space match entry; where said address space number is a value corresponding to a process executed on said processor, said match entry is a field having one value indicating that the address space number is to be required to be matched and having another value indicating that the address space number is not required to be matched;

storing a current number in said processor as part of a state of said processor;

and storing a third match value having one condition indicating that said match entry is to be disabled and having another condition indicating that said match entry is not to be disabled;

comparing said virtual address tag with a field of a virtual address generated by said processor, and also comparing said address space number with said current number, if comparing said virtual address tag with said field of said virtual address produces a match, and if said step of comparing of said address space number and said current number produces said match, and said match entry is of said one value, then using said page frame number for a memory reference; and if said match entry is said another value, then using said page frame number for said memory reference regardless of whether said address space number matches said current number, if said third match value is in said one condition.

2. The method of operating said processor according to claim 1 wherein said processor is executing a plurality of virtual machines, each having a number of processes, and is executing a virtual machine monitor.

3. The method of operating said processor according to claim 2 wherein said third match value is in said one condition for all page table entries in said translation buffer for said virtual machine monitor.

4. The method of operating said processor according to claim 1 including storing in said page table entries protection and access rights information.

5. The method of operating said processor according to claim 1 including the steps of fetching instructions from an external memory, decoding said instructions, and executing said instructions, said executing including accessing said external memory for read and write data; said external memory storing a page table of said page table entries.

6. The method of operating said processor according to claim 1 wherein said third match value is a disable bits stored in said translation buffer.

7. The method of operating said processor according to claim 6 wherein one of said disable bits is stored for each entry of said translation buffer.

8. A method of operating a processor system having a CPU and a memory, the CPU having a translation buffer for translating virtual addresses to physical addresses, said method of operating comprising the steps of:

storing in said translation buffer a number of page table entries, each page table entry containing a virtual address tag, a page frame number, and an address space number to characterize a location in said memory referenced by said page frame number;

also storing in said translation buffer for each page table entry (a) an address space match indication having one value indicating that said address space number must match a current value stored as part of a state of said processor and having another value indicating that said address space number need not match said current value, and (b) a match disable indication having a first value specifying that said address space match indicator is to be operable for said entry and having a second value indicating that said address space match indicator is not to be operable for an entry;

comparing a field of a virtual address generated by said processor with a virtual address tag of one of said page table entries in said translation buffer, and if said step of comparing indicates a match, and said address space match indication is of said another value, and said address space number matches a value stored as part of the state of said processor, then using said page frame number for addressing said memory;

if said step of comparing indicates said match, and said address space match indication is of said one value, regardless of whether said address space number matches said current value, using said page frame number for addressing said memory;

if said step of comparing indicates a match, and said match disable indication is of said first value, regardless of whether said address space match indication is of said one value or said another value, then using said page frame number for addressing said memory only if said address space number matches said current value.

9. The method of operating said processor system according to claim 8 including fetching instructions from an external memory, decoding said instructions, and executing said instructions, said executing including accessing said external memory for read and write data; said external memory storing a page table of said page table entries.

10. The method of operating said processor system according to claim 8 including storing in said page table entries protection and access rights information.

11. The method of operating said processor system according to claim 8 wherein said processor is executing a plurality of virtual machines, each having a number of processes, and executing a virtual machine monitor.

12. The method of operating said processor system according to claim 11 wherein said disable match indicator is on for all page table entries in said translation buffer for said virtual machine monitor.

13. The method of operating said processor system according to claim 8 wherein said match disable indication is stored in said translation buffer.

14. The method of operating said processor system according to claim 13 wherein said match disable indication is stored for each entry of said translation buffer.

15. The method of operating said processor system according to claim 8 wherein said processor system includes a plurality of CPUs accessing said memory.

16. A processor comprising:
addressing means including a translation buffer for translating virtual addresses to physical addresses, said translation buffer storing a plurality of page table entries, each page table entry containing a page frame number indexed by a virtual address tag;

said translation buffer including means for storing for each said page table entry an address space number, means for storing an address space match entry, and means for storing a match disable indicator; where said address space number corresponds to a process executed on said processor, said match entry is a field having one value indicating that the address space number is to be required to be matched and having another value indicating that the address space number is not required to be matched, and said match disable indicator is an indication having a first value indicating that said match entry is to be ignored and having a second value indicating that said match entry is not to be ignored;

means for maintaining in said processor as part of a state of said processor a current number representing said address space number;

first means for comparing said virtual address tag with a field of a virtual address generated by said processor, and also second means for comparing said address space number with said current number, and if both of said first and second means for comparing produce a match, and said match entry is of said one value, then said addressing means using said page frame number for a memory reference;

if said means for comparing said virtual address tag with said field of said virtual address produces said match, and if said match entry is of said another value, then said addressing means using said page frame number for said memory reference regardless of whether said second first means for comparing finds that said address space number matches said current number, unless said disable indicator is set to said first value.

17. The processor according to claim 16 including means for fetching instructions from an external memory, decoding said instructions, and executing said instructions, said executing including accessing said external memory for read and write data; said external memory storing a page table of said page table entries.

18. The processor according to claim 17 including means for generating virtual addresses used for said fetching of instructions and said accessing said external memory for data, said virtual addresses being compared to address tags in said translation buffer.

19. The processor according to claim 16 wherein said page table entries also contain protection and access rights information.

20. A processor system having a CPU and a memory, said processor system comprising:

a) means in said CPU for fetching instructions from said memory, means in said CPU for decoding said instructions, and means in said CPU for executing said instructions, said means for executing including means for accessing said memory for read and write data;

b) means in said CPU for generating a virtual address used by said means for fetching of instructions and by said means for accessing said memory for data;

c) a page table stored in said memory and containing a plurality of page table entries, each page table entry including a page frame number referencing a different page of said memory;

d) means for translating said virtual address to a physical address for said memory, said means for translating including a translation buffer storing a number of said page table entries;

e) and means for addressing said memory using the page frame number from said translation buffer and using a part of said virtual address;

f) said translation buffer storing for each said page table entry an address tag and an address space number, and storing an address space match entry, where said address space number is a value corresponding to a process executed on said CPU, and said match entry is an indicator having one value indicating that the address space number is to be required to be matched and having another value indicating that the address space number is not required to be matched; said translation buffer also storing for each said page table entry a match disable indicator; means in said CPU for storing a current number representing an address space value maintained as part of a state of said CPU;

g) compare means in said translation buffer for first comparing said address tag with a field of said virtual address generated by said CPU, and also second comparing said address space number with said current number maintained as part of the state of said CPU, and if both of said first and second comparing by said compare means produce a match, and said match entry is of said one value, then said addressing means using said page frame number for a memory reference; or if comparing said address tag with said field of said virtual address produces said match, and if said match entry is of said another value, then said addressing means using said page frame number for said memory reference regardless of whether said address space number matches said current number, unless said disable match indicator is set.

21. The processor system according to claim 20 wherein said CPU is executing a plurality of virtual machines, each having a number of processes, and executing a virtual machine monitor.

22. The processor system according to claim 21 wherein said disable match indicator is set for all page table entries in said translation buffer for said virtual machine monitor.

23. A system according to claim 20 wherein said processor system includes a plurality of CPUs accessing said memory.

* * * * *